United States Patent [19]

Ohba

[11] Patent Number: 5,101,268

[45] Date of Patent: Mar. 31, 1992

[54] VISUAL POINT POSITION CONTROL APPARATUS

[75] Inventor: Akio Ohba, Kanagawa, Japan

[73] Assignee: Sony Corporation, Tokyo, Japan

[21] Appl. No.: 623,110

[22] Filed: Dec. 3, 1990

[30] Foreign Application Priority Data

Dec. 5, 1989 [JP] Japan .................................. 1-316107

[51] Int. Cl.$^5$ ............................................. H04N 13/02
[52] U.S. Cl. ...................................... 358/88; 358/180;
359/470; 352/86
[58] Field of Search ..................... 358/3, 88, 903, 180,
358/93; 350/130, 136; 354/112; 352/86, 43;
340/729; 364/522, 474.24, 474.37; 359/470, 462

[56] References Cited

U.S. PATENT DOCUMENTS

| | | | |
|---|---|---|---|
| 4,420,230 | 12/1983 | McElveen | 352/43 |
| 4,667,236 | 5/1987 | Dresdner | 358/160 |
| 4,672,559 | 6/1987 | Jansson et al. | 358/93 |
| 4,875,097 | 10/1989 | Jackson | 358/180 |
| 4,956,706 | 9/1990 | Ohba | 358/160 |
| 4,961,154 | 10/1990 | Pomerantz et al. | 364/522 |
| 4,966,436 | 10/1990 | Mayhew et al. | 358/88 |
| 4,994,989 | 2/1991 | Usami et al. | 340/729 |
| 5,013,147 | 5/1991 | Montes | 352/58 |
| 5,065,236 | 11/1991 | Diner | 358/88 |

Primary Examiner—James J. Groody
Assistant Examiner—Jeffrey S. Murrell
Attorney, Agent, or Firm—Limbach & Limbach

[57] ABSTRACT

The positions of the visual points of images picked up by first and second cameras are controlled by producing a first model of a picked up plane of the image of an object in a three-dimensional coordinate system based on coordinates of the image pickup elements of the first camera and an image pickup angle of the first camera relative to an image of the object picked up, producing a second model of a picked up plane of the image of the object in the three-dimensional coordinate system based on coordinates of the image pickup elements of the second camera and an image pickup angle of the second camera relative to an image of the object picked up, mapping image data output from the first camera onto the first model, mapping image data output from the second camera onto the second model, mathematically rotating and moving the first and second models onto which image data are mapped within an angle $\alpha$ formed by the first and second cameras in the three-dimensional coordinate system by angles $\beta$ and $(\alpha - \beta)$, and mixing the image data mapped onto the first model and the image data mapped onto the second model by a mixing ratio corresponding to the rotation angles of the first and second models.

11 Claims, 13 Drawing Sheets

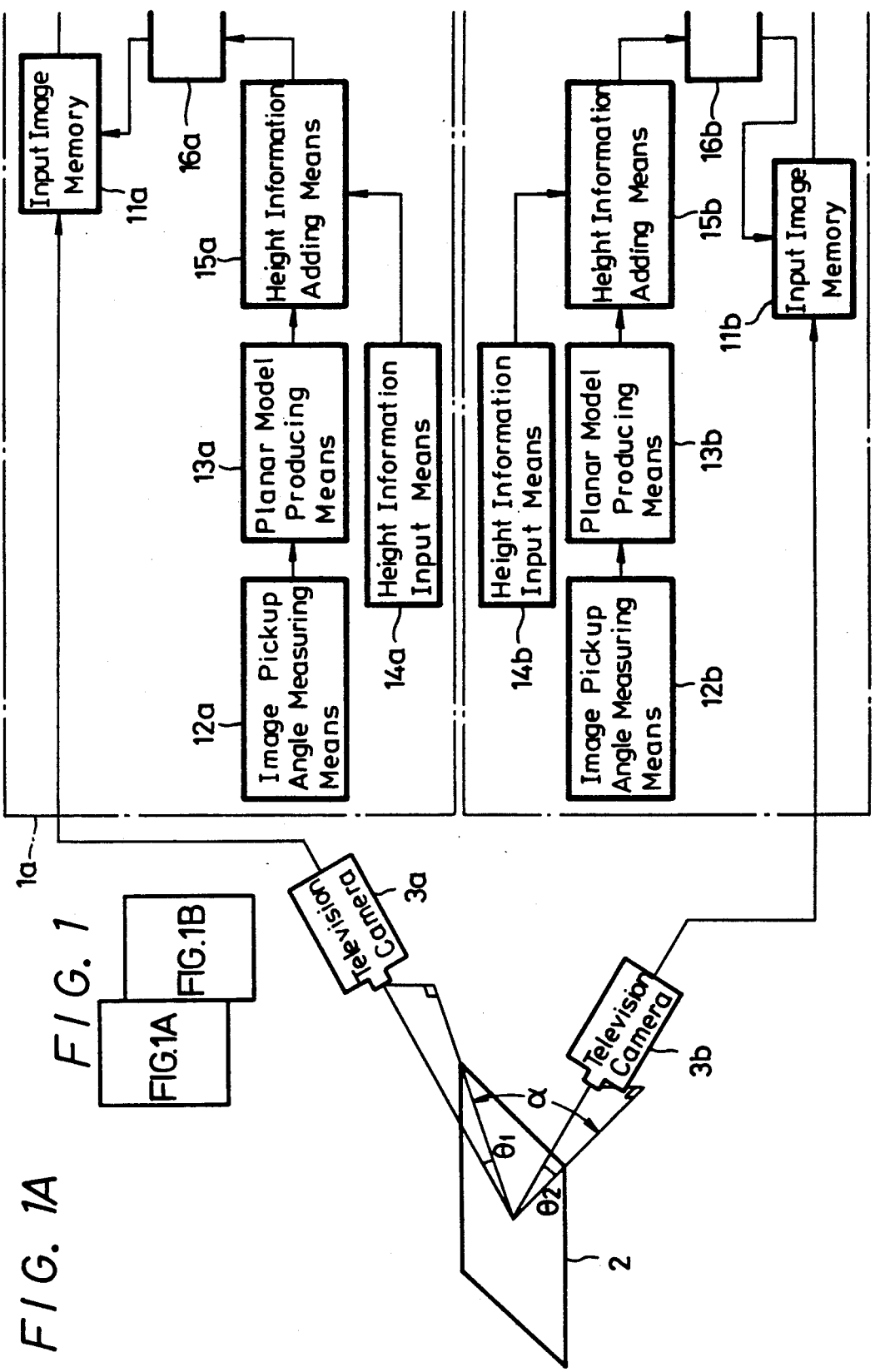

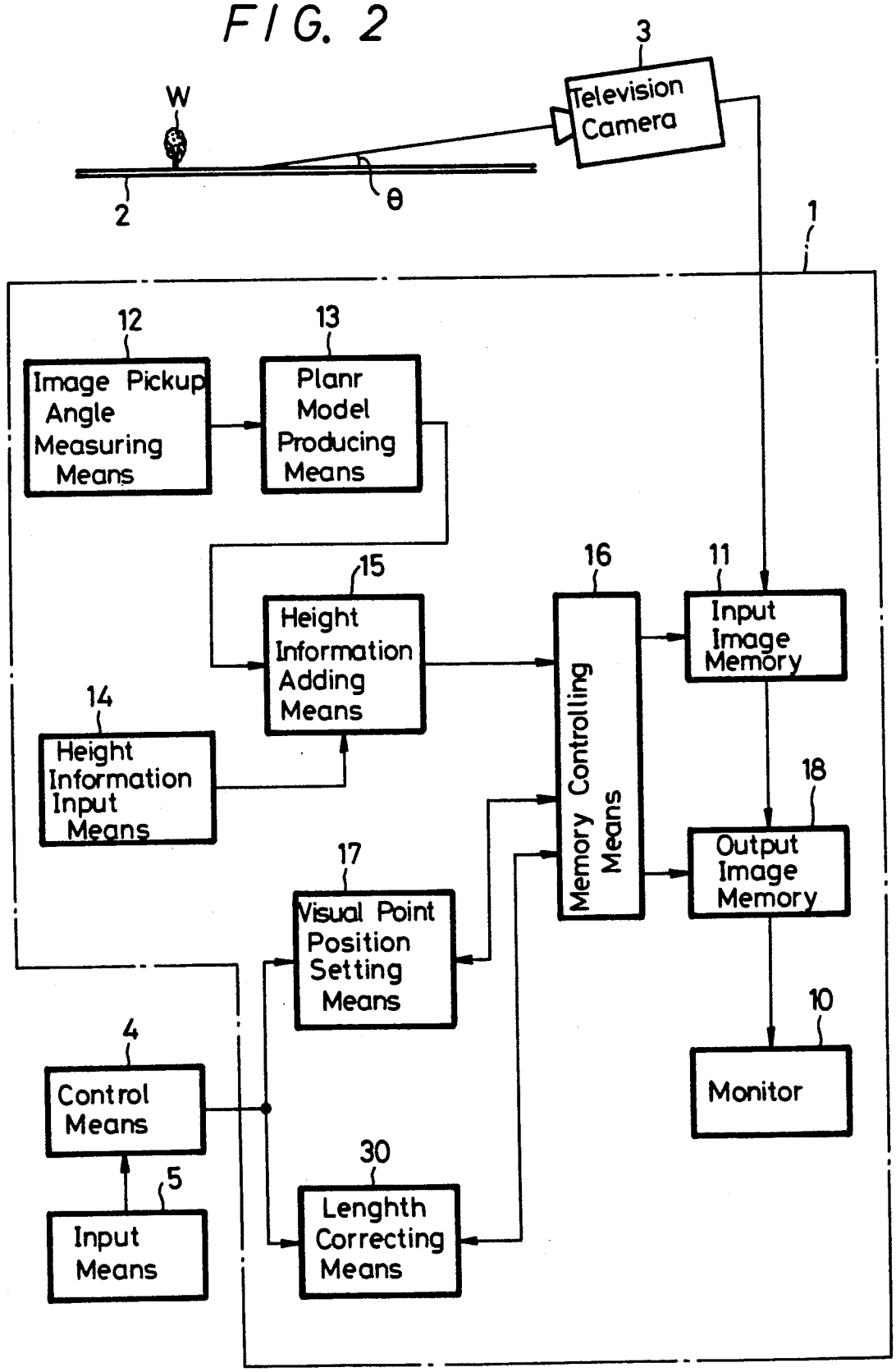

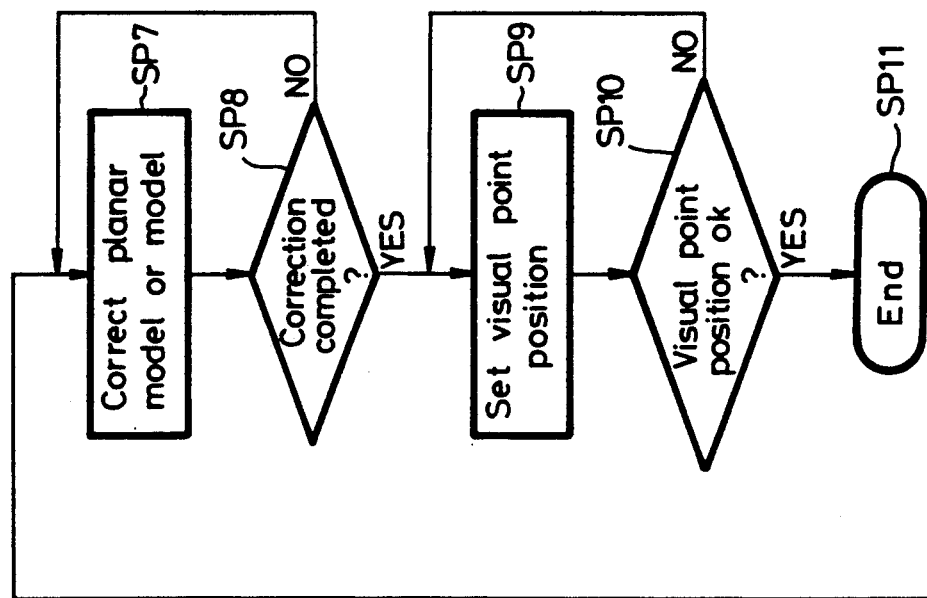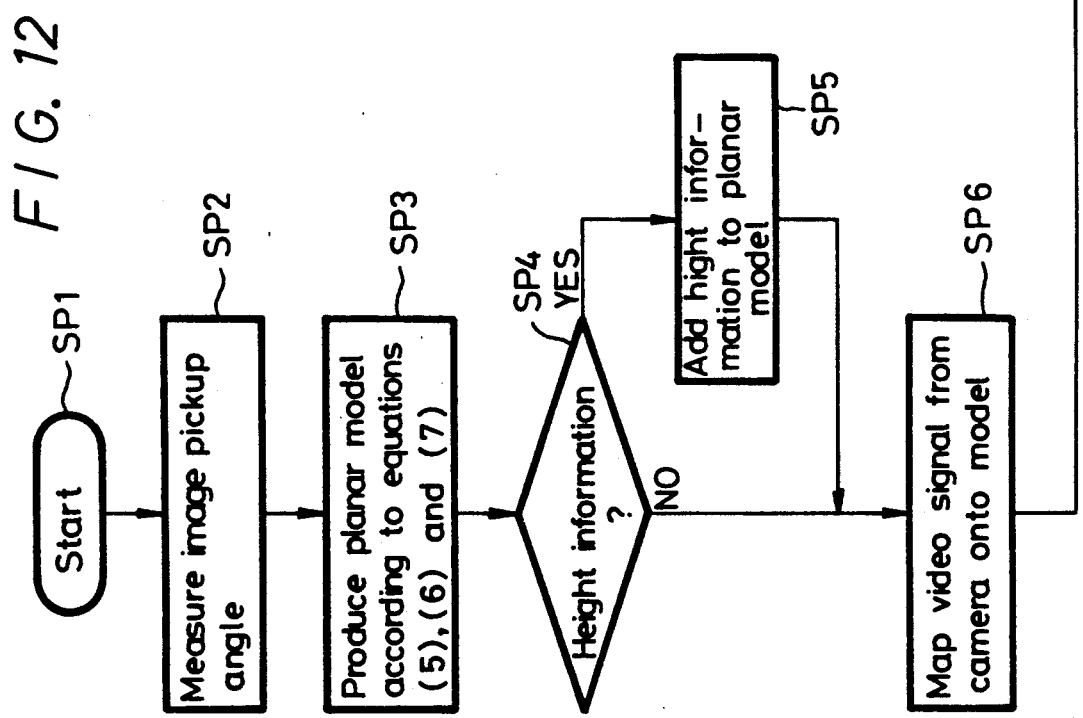
FIG. 12

(3a) (3b)

VISUAL POINT POSITION CONTROL APPARATUS

BACKGROUND OF THE INVENTION

1. Field of the Invention

The present invention relates generally to image signal processing apparatus and, more particularly, is directed to an image signal processing apparatus for controlling a visual point of a video image picked up by a video camera.

2. Description of the Prior Art

When a sports event is broadcast by, for example, a television broadcast, a plurality of video cameras are located at respective positions of the place where the sports events are carried out, and one of video images from these plurality of video cameras is selected and broadcast. In that case, in order to perform more proper shooting, a single object is picked up by more than two video cameras, and output video images from these video cameras are sequentially switched and displayed.

However, if the output video images are switched unintentionally, visual point positions are switched discretely so that viewers cannot grasp the situations of the sports event being broadcast and there is a risk that the presentation of the sports event will be degraded considerably.

More particularly, when a baseball game is broadcast, if the video cameras are located at a backstop, a first base and a third base and the video cameras are unintentionally switched under the condition that an image of a second base is picked up, it becomes difficult for the viewer to recognize the situation of baseball such as when a runner runs, a fielder throws a ball and so on.

OBJECTS AND SUMMARY OF THE INVENTION

Accordingly, it is an object of the present invention to provide an improved image processing apparatus which can eliminate the aforenoted shortcomings and disadvantages encountered with the prior art.

More specifically, it is an object of the present invention to provide a visual point position control apparatus in which when output images of a plurality of video cameras are switched and selectively displayed, a visual point can be changed successively.

As an aspect of the present invention, a visual point position control apparatus is provided to control visual point positions of images picked up by first and second cameras. This visual point position control apparatus is comprised of a first producing means, based on coordinates of the respective picture elements of the image pickup elements of the first camera and an image pickup angle of the first camera relative to an image of an object picked up, for producing a first model of a picked up plane of the image of the object in a three-dimensional coordinate system. Also included is second producing means, based on coordinates of the respective picture elements of the image pickup elements of the second camera and an image pickup angle of the second camera relative to an image of an object picked up, for producing a second model of a picked up plane of an image of object in a three-dimensional coordinate system. A first mapping means maps the image data output from the first camera onto the first model produced by the first producing means and second mapping means maps the data output from the second camera onto the second model produced by the second producing means. Moving means rotates and moves the first and second models to which the image data are mapped within an angle $\alpha$ formed by the first and second cameras in the three-dimensional coordinate system by angles $\beta$ and $(\alpha - \beta)$. Mixing means mixes the image data mapped onto the first model and the image data mapped onto the second model by a mixing ratio corresponding to rotation angles of the first and second models.

The above, and other objects, features and advantages of the present invention will be apparent in the following detailed description of illustrative embodiments to be read in conjunction with the accompanying drawings, in which like reference numerals are used to identify the same or similar parts in the several views.

BRIEF DESCRIPTION OF THE DRAWINGS

FIG. 2 is a block diagram showing a video image processing apparatus used in the image signal processing apparatus of FIG. 1;

FIG. 12 is a flowchart to which reference will be made in explaining an operation of the video image processing apparatus shown in FIG. 2;

DETAILED DESCRIPTION OF THE PREFERRED EMBODIMENTS

Figure 1B:
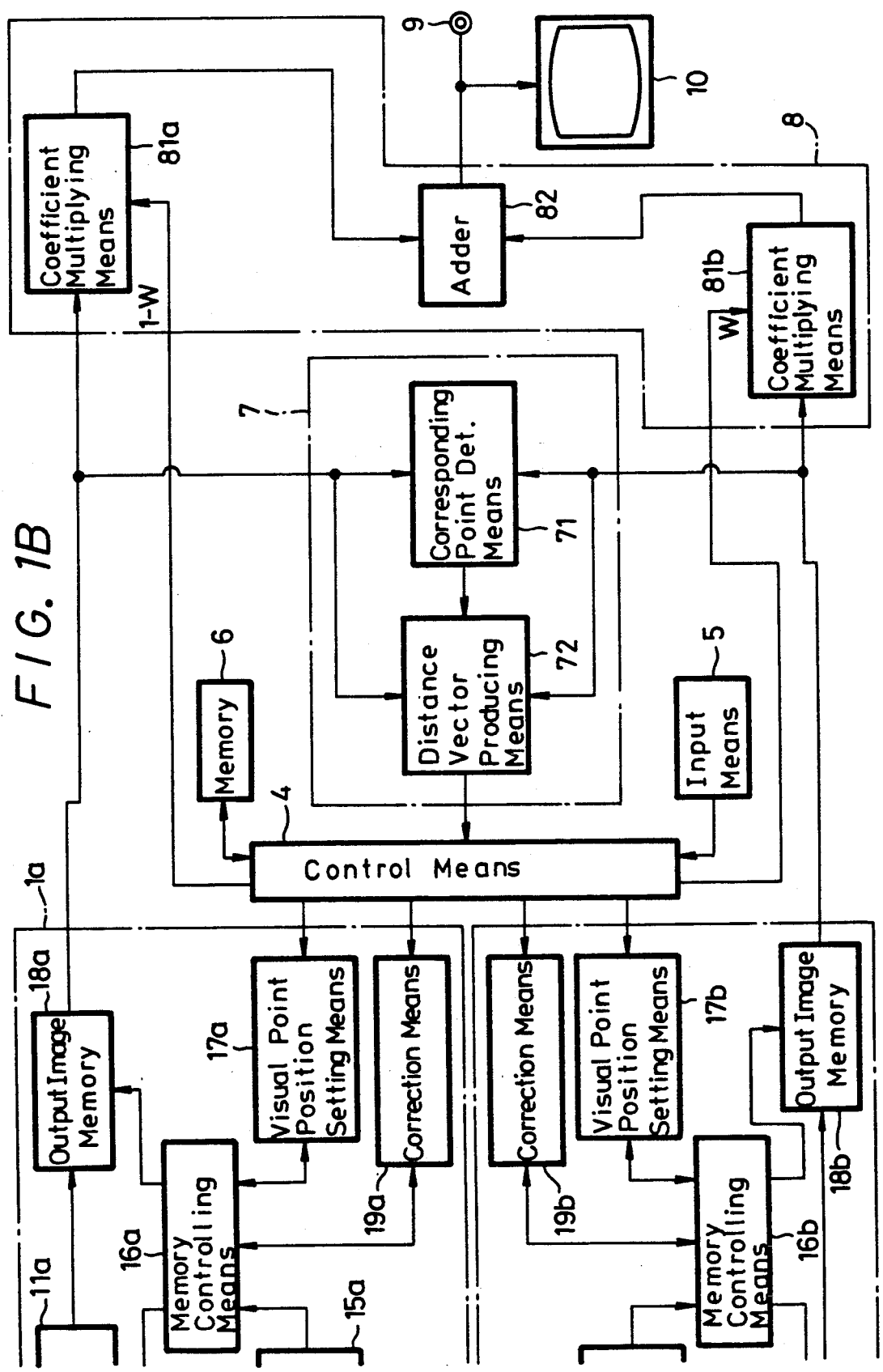
FIG. 1 (formed of FIGS. 1A and 1B drawn on two sheets to permit the use of a suitably large scale) is a block diagram showing a first embodiment of the image signal processing apparatus according to the present invention.

Referring to the drawings in detail, and initially to FIG. 1, there are provided video image processing apparatus 1a and 1b that the assignee of the present application has proposed previously. In this embodiment, two video image processing apparatus 1a and 1b are utilized and an image of an object such as a baseball ground is represented by reference numeral 2. The object of an image such as the baseball ground 2 is picked up by two television cameras 3a and 3b. Video signals from these television cameras 3a and 3b are respectively supplied to input image memories 11a and 11b of the video image processing apparatus 1a and 1b and stored therein such that picture elements are each stored at predetermined addresses.

At this time, the television cameras 3a and 3b are fixed and the image pickup angles thereof are $\theta_1$ and $\theta_2$, respectively. The image pickup angles $\theta_1$ and $\theta_2$ are respectively measured by image pickup angle measuring means 12a and 12b, and these measured image pickup angles $\theta_1$ and $\theta_2$ are supplied to planar model producing means 13a and 13b, respectively. The planar model producing means 13a and 13b respectively produce planar models based on the input image pickup angles $\theta_1$ and $\theta_2$.

Further, data representing the ups and downs (i.e. height informations) of the object 2 are measured beforehand and are input via height information input means 14a and 14b. These input height informations are supplied to height information adding means 15a and 15b, respectively, and the height information adding means 15a and 15b modify the data representing the planar models delivered from the planar model producing means 13a and 13b based on the height informations to thereby produce models representing the models having ups and downs.

The data representing the models having ups and downs are supplied to memory controlling means 16a and 16b, respectively, whereby the picture elements stored in the input image memories 11a and 11b are mapped to the models having ups and downs and are read out therefrom.

There are provided control means 4, input means 5 for inputting thereto a control command from the operator and a memory 6 in which control data or the like are stored. When the television feed is switched from the television camera 3a, for example, to the television camera 3b, the position of a desired visual point on a line connecting the television cameras 3a and 3b is calculated by the control means 4 on the basis of the command from the input means 5. The data representing the position of this visual point are supplied to visual point position setting means 17a and 17b, and the visual point positions set in these setting means 17a and 17b are supplied to memory control means 16a and 16b, respectively. Thus, data of the respective picture elements read out from the input image memories 11a and 11b by mapping the planar models are respectively stored in output image memories 18a and 18b by rotating the respective planar models on the basis of the visual point positions set in the setting means 17a and 17b. The assignee of the present application has previously proposed a formation of the models having ups and downs, a data mapping and rotation technique (see U.S. Pat. No. 4,956,706).

The operation principle of the image processing apparatus 1a and 1b will be explained in association with a golf course used as an image of object picked up.

The structures of the image processing apparatus 1a and 1b will be described with reference to FIG. 2. In the explanation using FIG. 2, suffixes a and b are omitted.

As shown in FIG. 2, an image of an object such as a golf course 2 is picked up by a television camera 3. At this time, the television camera 3 is fixed and the image pickup angle thereof is $\theta$. The image pickup angle is measured by an image pickup angle measuring means 12 and supplied to a planar model producing means 13. The planar model producing means 13 produces a planar model based on the input image pickup angle $\theta$. The data representing the planar model produced by the planar model producing means 13 is supplied to a height information adding means 15. The height information adding means 15 modifies the data representing the planar model based on height information delivered from a height information input means 14 to thereby produce data representing the model having ups and downs. The data representing the model having ups and downs is supplied to a memory controlling means 16. A video signal output from the television camera 3 is supplied to an input image memory 11 and stored therein such that picture elements are each stored at predetermined addresses. Meanwhile, a visual point setting means 17 produces visual point setting data based on visual point controlling data received from the control means 4 and supplies the visual point setting data to the memory controlling means 16. A length correction means 30 produces correction data based on correction control data received from the control means 4 and supplies the correction data to the memory controlling means 16. The memory controlling means 16, based on the data representing the model having ups and downs supplied from the height information adding means 15, the visual point setting data supplied from the visual point setting means 17, and the correction data supplied from the length correction means 30, produces read addresses for the input image memory 11 and write addresses for a output image memory 18. The read addresses for the input image memory 11 and the write addresses for the output image memory 18 are respectively supplied to the input image memory 11 and the output image memory 18, whereby the video signal stored in the input image memory 11 is read out and stored at predetermined addresses of the output image memory 18. The video signal read out of the output image memory 18 is supplied to a monitor 10 and displayed on its monitor screen.

Now, in the image processing apparatus 1 for picking up an image of an object such as the golf course 2 or the like by the television camera 3, the principle of producing a planar model in a three-dimensional coordinate system based on the image pickup angle $\theta$ at that time and mapping a video signal output from the television camera 3 onto the planar model disposed in the three-dimensional coordinate system will be described below.

Figure 3:
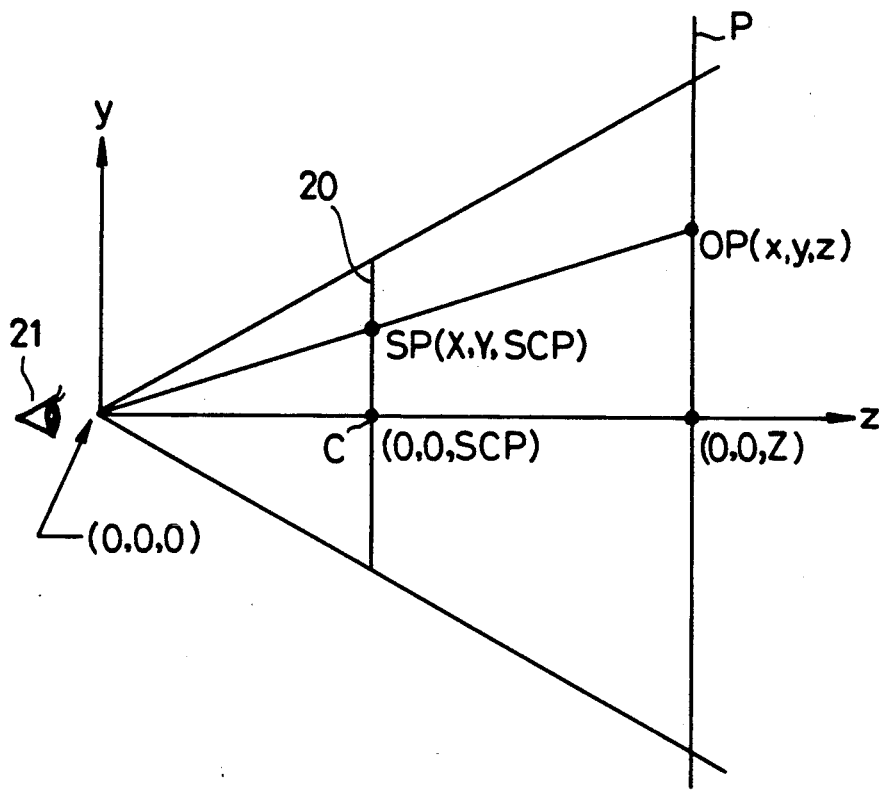
FIGS. 3 and 4 are schematic diagrams used to explain a principle in which a planar model is formed in a three-dimensional coordinate system by the video image processing apparatus of FIG. 2, respectively.

FIG. 3 shows a state, when an image of an object on a plane P is picked up by the television camera 3 set in the direction perpendicular to the plane P, of the object on the plane P perspectively transformed onto the image pickup device (screen 20) of the television camera 3. Conversely speaking, the real position of the object whose image is picked up by the television camera 3 is on the plane P located at a specific distance from the screen 20 in the direction opposite to the position of visual point 21. Therefore, when the position OP of the object on the plane P is represented by (x, y, z), the position of visual point 21 is taken as the origin (0, 0, 0), the center C of the screen 20 is represented by (0, 0, SCP), and the position SP of the object perspectively transformed onto the screen 20 is represented by (X, Y, SCP), the relationship between the position OP of the object on the plane P and the position SP of the object perspectively transformed onto the screen 20 is expressed by the following equations $$X = \frac{SCP \cdot x}{Z} \tag{1}$$

$$Y = \frac{SCP \cdot y}{Y} \tag{2}$$

Figure 4:
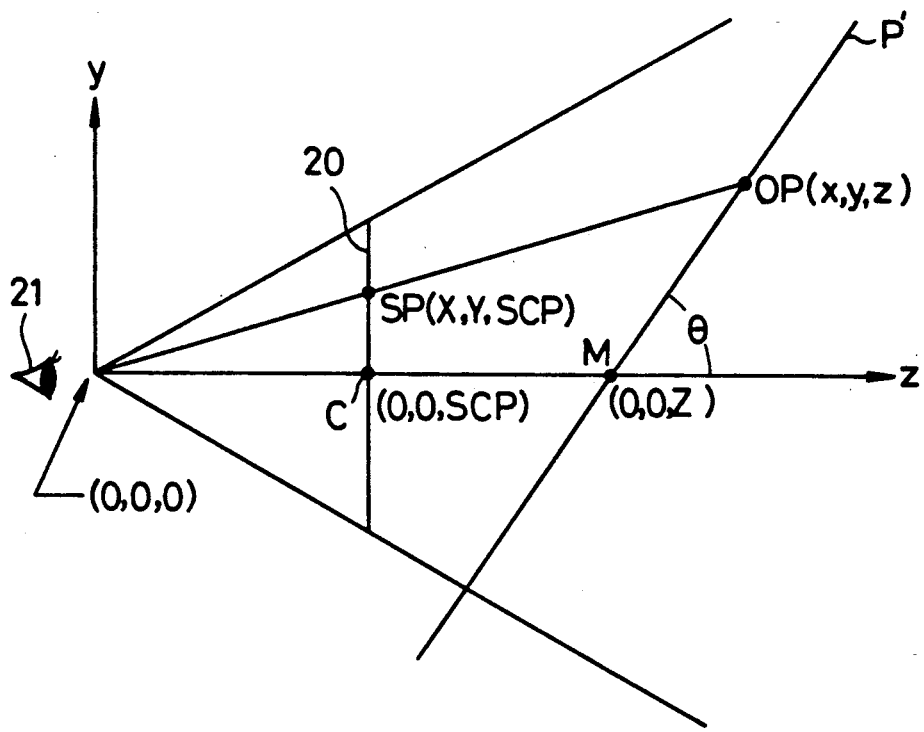

Then, a plane P' which is an inclined plane of the plane P shown in FIG. 3 by a predetermined angle as shown in FIG. 4 is considered. Assuming that this plane P' is inclined by an angle $\theta$ with respect to the x - z plane at position M, the relationship between the position OP of an object on the plane P' and the position SP of the object perspectively transformed on the screen 20 is expressed by the following equations $$X = \frac{SCP \cdot x}{Z + y \cos\theta} \tag{3}$$

$$Y = \frac{SCP \cdot y \cdot \sin\theta}{Z + y \cos\theta} \tag{4}$$

By solving the equations (3) and (4) for x and y, there are obtained $$x = \frac{X \cdot Z + X \cdot y \cdot \cos\theta}{SCP} \tag{5}$$

$$y = \frac{Y \cdot Z}{SCP \cdot \sin\theta - Y \cdot \cos\theta} \tag{6}$$

and then, z becomes $$z = Z + Y \cdot \cos\theta \tag{7}$$

As apparent from equations (5), (6), and (7), by measuring the image pickup angle $\theta$ of the television camera 3 with respect to the plane P' at the time when the image of the plane P' is picked up by the television camera 3, and substituting the angle $\theta$ and the position (X, Y, SCP) of each picture element of the object perspectively transformed onto the screen 20 into equations (5), (6) and (7), the plane P' in the three-dimensional coordinate system can be calculated. Here, Z is the distance from the position of visual point 21 to the position M of the plane P'. This distance is equal to the distance between the point at which the optical axis of the television camera 3 intersects with the golf course 2 and television camera 3. Further the plane P' formed as above is referred to as the planar model P'.

By assigning video data of picture elements of the object perspectively transformed onto the screen 20 to the corresponding coordinates on the planar model P' produced as described above, the mapping of the video data onto the planar model P' in the three-dimensional coordinate system is achieved. Thus, it is made possible to produce in the three-dimensional coordinate system the planar model P', which is inclined with respect to the x - z plane by an angle which is the same as the image pickup angle $\theta$ of the television camera 3 when picking up the image of the object on the plane P'. The video data mapped onto the planar model P' disposed in the three-dimensional coordinate system is supplied to the monitor 10 shown in FIG. 2.

As described above, by adding arbitrary values, which are mutually associated, to the coordinate values corresponding to the positions of the respective picture elements of the planar model P' disposed in the three-dimensional coordinate system, the planar model P' can be rotationally transformed in the three-dimensional coordinate system. And thereby, it is made possible to change the position of the visual point with respect to the planar model P' displayed on the monitor 10.

Figure 5:
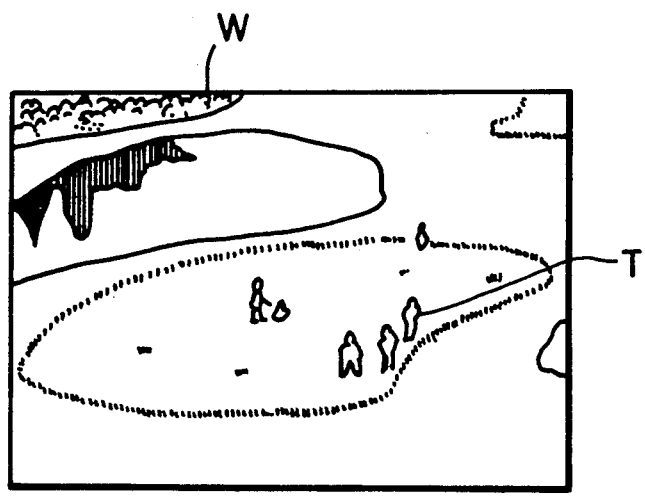
FIG. 5 is a schematic diagram showing an example of an image picked up by the video camera of the image signal processing apparatus of FIG. 1.
Figure 6:
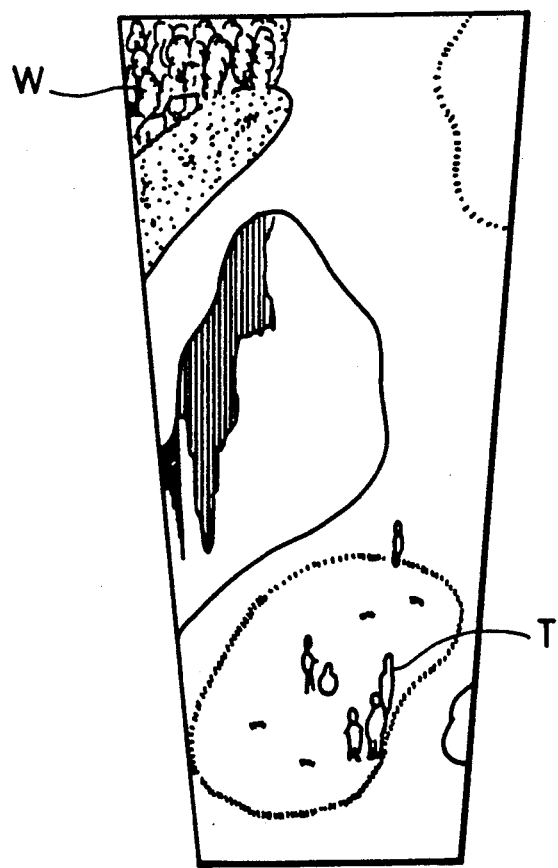
FIG. 6 is a schematic diagram showing an image in which a visual point of the image shown in FIG. 5 is moved by the video image processing apparatus of FIG. 2.

Therefore, even if the image pickup angle $\theta$ of the television camera 3 with respect to the golf course 2 is fixed as shown in FIG. 2, the position of the visual point with respect to the golf course 2 displayed on the monitor 10 can be changed. Hence, it is made easy to change the position of the visual point, as if the television camera 3 were brought high to pick up the image of the golf course 2 from above. More particularly, when there is picture information, for example, as shown in FIG. 5 as a picture image picked up by the television camera 3, a picture for which the position of the visual point is moved to a place high above as shown in FIG. 6 can be obtained without changing the image pickup angle $\theta$ of the television camera 3.

Thus, according to the present invention, the position the visual point can be determined at will and it is thereby made easy to acquire the sense of distance.

When the position of the visual point for the plane P' is optionally changed as described above, however, since the planar model P' is formed with the object such as the golf course 2 approximated to a plane, those parts that are not lying on the plane P' such as trees W and humans T in the picture image make the image appear unnatural when the position of visual point is moved.

Figure 7A:
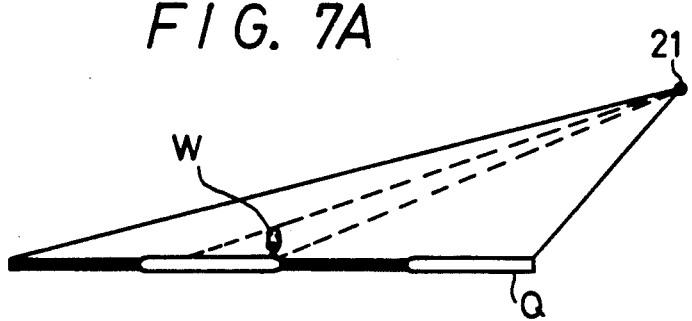
FIGS. 7A-7F are schematic diagrams used to explain a principle in which an unnatural portion of the image shown in FIG. 6 is corrected, respectively.
Figure 7B:
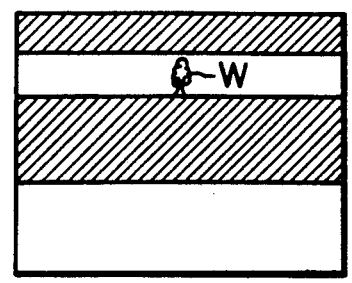
Figure 7C:
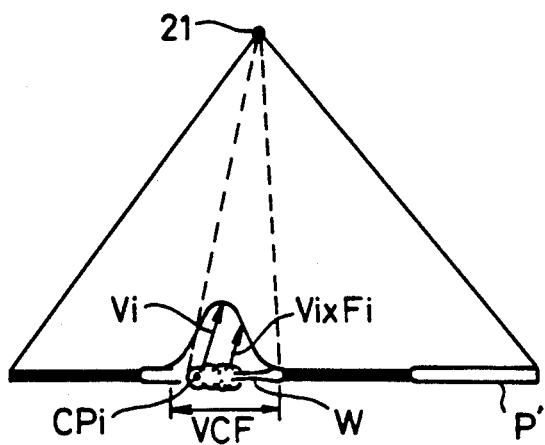
Figure 7D:
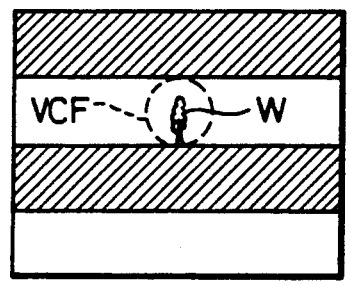

The state of an image of such an object as a tree W standing on the ground Q picked up with the television camera 3 from a position of visual point 21, as shown in FIG. 7A, and displayed on the monitor 10 is shown in FIG. 7B. If, as shown in FIG. 7C, the position of visual point 21 with respect to the object displayed on the monitor 10 is brought to the position above the object as described above, the length of the tree W will be prolonged as shown in FIG. 7D. This is because the condition of the television camera 3 picking up the image of the object as shown in FIG. 7A is nothing but the condition, as shown in FIG. 7C, of its picking up the image of the tree W lying on the ground Q shown in FIG. 7A.

The method to correct the length of the standing tree W or human being T will be described below. As the means for correction, the technique proposed earlier by the assignee of the present application and described in U.S. Pat. No. 4,791,581 is used.

First, an area VCF to be deformed is defined within the planar model P' as shown in FIGS. 7C and 7D. Then, a deformation vector $V_i$ having a direction and quantity of deformation is set up. Further, a point of action $CP_i$, indicating the position to apply the deformation, and a vector field function $F_i$ are set up. Then, representing the position vector of the planar model P' before the deformation by $P_0$, the position vector $P_N$ of the planar model P' after the deformation is given by $$P_N = P_0 + \sum_{i=1}^{N} V_i * F_i (P_{i-1}, CP_i) \quad (8)$$

Figure 7E:
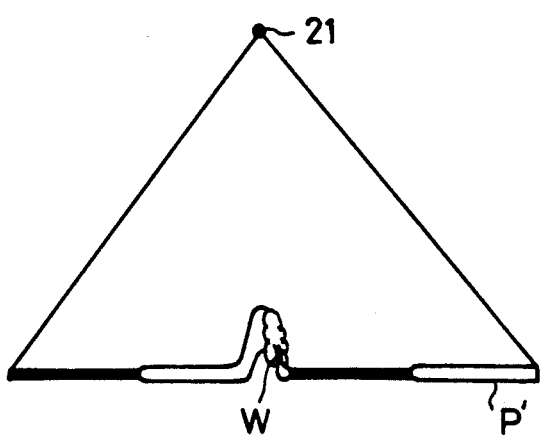
Figure 7F:
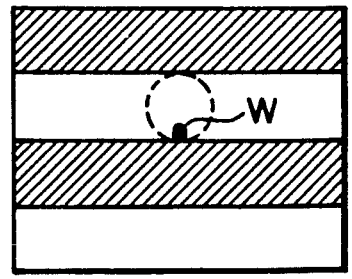

The state of the planar model P' deformed as described above is shown in FIG. 7E. That is, the tree W is now set upright. Thus, as shown in FIG. 7F, the prolonged state of the tree W is corrected, and thereby, the ground Q and the tree W are displayed on the monitor 10 in the same state as that where the television camera 3 is brought to the position right above the tree W.

Figure 8:
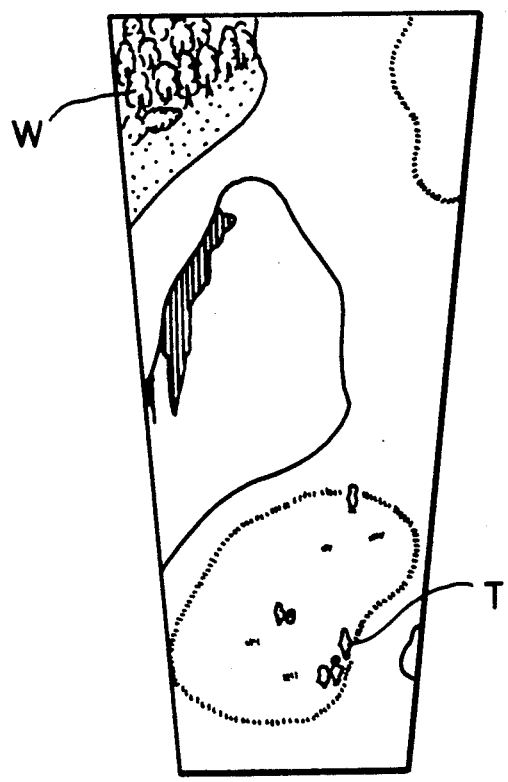
FIG. 8 is a schematic diagram showing an image which results from correcting the unnatural portion of the image shown in FIG. 6.

By performing the correction as described above, the picture image having humans T and trees W made longer than real size can be corrected and thus the picture as shown in FIG. 8 can be obtained.

Figure 9:
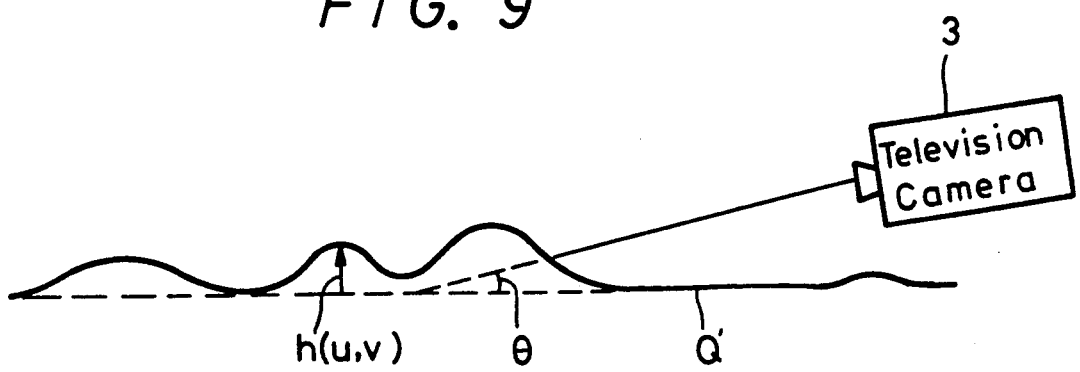
FIGS. 9 and 10 are schematic diagrams used to explain a principle in which a model having ups and downs is formed in a three-dimensional coordinate system by the video image processing apparatus of FIG. 2, respectively.
Figure 10:
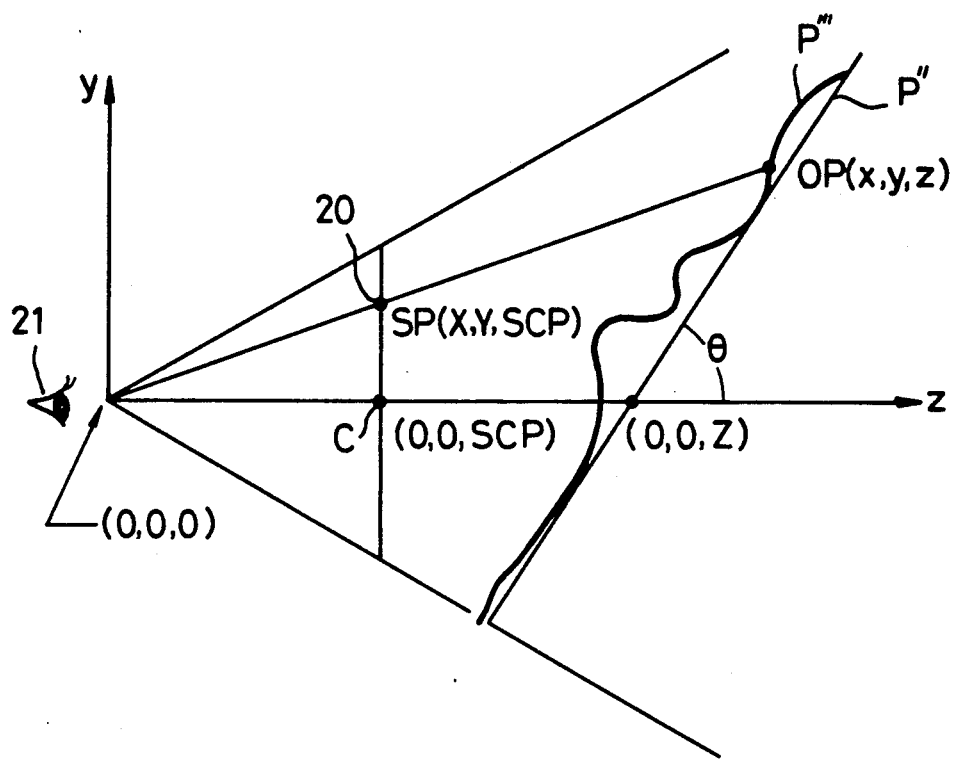

Now, referring to FIG. 9, the case where height h(u,v) of an object such as the ground Q' is given by such an information source as a topographical map and so on will be described. First, as described above, by substituting the image pickup angle $\theta$ of the television camera 3 with respect to the ground Q' and the positions (X, Y, SCP) of the respective picture elements of the object perspectively transformed onto the screen 20 into the equations (5), (6) and (7), a planar model P'' in the three-dimensional coordinate system is obtained as shown in FIG. 10. Then, the thus produced planar model P'' is deformed based on the data h(u, v) representative of the height at an arbitrary position (x, y, z) of the planar model P''. The coordinates (x, y, z) of an arbitrary position in the three-dimensional coordinate system of the planar model P'' after the deformation are calculated from $$x = \frac{X*Z + X*y*\cos\theta}{SCP} \quad (9)$$

$$y = \frac{Y*Z}{SCP*\sin\theta - Y*\cos\theta} + h(u, v) * \cos\theta \quad (10)$$

$$z = Z + y * \cos\theta + h(u, v) * \sin\theta \quad (11)$$

These equations can be derived from equations (6) and (7) by adding components along the y axis and the z axis of the height h(u, v) of the object to their right-hand sides, respectively. By using the above-mentioned equations (9), (10) and (11), a model P''' having ups and downs corresponding to the object in the three-dimensional coordinate system as shown in FIG. 10 can be produced. Further, by the use of equations (9), (10) and (11), it is made possible to uniquely associate positions of the picture elements of the object perspectively transformed on the screen 20 to the corresponding coordinates of the model P''' having ups and downs. Accordingly, on the basis of equations (9), (10) and (11), by assigning the video data of respective picture elements of the object perspectively transformed on the screen 20 to the corresponding coordinates of the model P''' having ups and down, it is achieved to map the video data onto the model P''' having ups and downs in the three-dimensional system. Thus, the model P''' having ups and downs which is inclined with respect to the x - z plane by the same angle as the image pickup angle $\theta$ of the television camera 3 when picking up the image of the object on the ground Q' and having the video data can be produced in the three-dimensional coordinate system. The video data of the model P''' having ups and downs disposed in the three-dimensional coordinate system is supplied to the monitor 10 shown in FIG. 2 and displayed on the same.

By adding optional values which are mutually associated to the coordinates corresponding to positions of the picture elements of the model P''' having ups and downs and disposed in the three-dimensional coordinate system as described above, the model P''' having ups and downs and disposed in the three-dimensional coordinate system can be rotated. That is, the angle of inclination of the model P''' having ups and downs with respect to the x - z plane can be optionally changed. Therefore, when the video data of the model P''' having ups and downs and arranged in the three-dimensional coordinate system is displayed on the monitor 10, the orientation of the displayed model P''' having ups and downs can be changed. In other words, the position of the visual point with respect to the model P''' having ups and downs can be changed.

Figure 11:
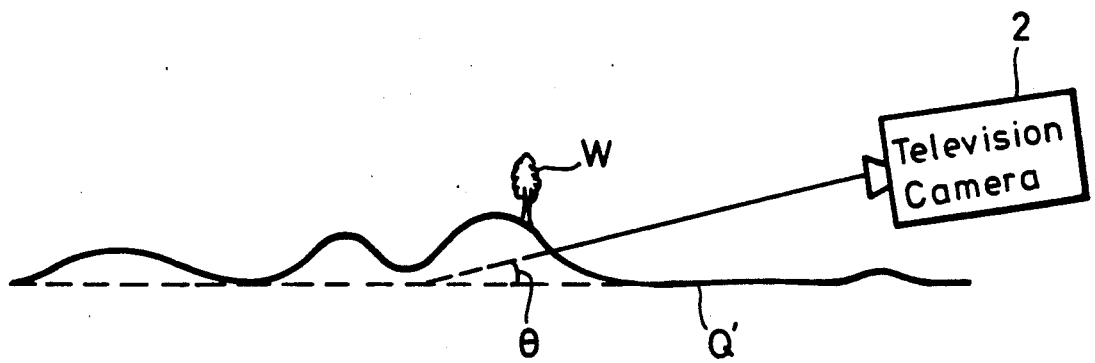
FIG. 11 is a schematic diagram used to explain a portion in which an image becomes unnatural after the position of the visual point has been moved in the video image processing apparatus of FIG. 2.

At the time the position of the visual point with respect to the model P''' having ups and downs is changed as described above, if there is a tree W on the ground Q' as shown in FIG. 11, the length of the tree W will become too large when the position of the visual point is brought high. This is because there are generally not included data expressing heights of trees W in the information of the heights of the ground obtained from a topographical map or the like, and therefore, when producing the model P''' having ups and downs, the heights of trees W are neglected and they are considered to be lying on the ground having ups and downs.

The length of the tree W becoming too large when the position of visual point is brought high can be corrected in the same way as described above using FIG. 7. First, an area VCF to be deformed is defined in the model P''' having ups and downs. Then, a deformation vector $V_i$ having direction and quantity of deformation is set up. Further, a point of action $CP_i$, indicating the position where the deformation is performed, and a vector field function $F_i$ are set up. Then, assuming the position vector of the model P''' having ups and downs before deformation as $P_0$, the position vector $P_N$ of the model P''' having ups and downs after the deformation is calculated by the use of equation (8). Thereafter, the model P''' having ups and downs is further deformed according to the position vector $P_N$ and thereby the length of the tree W can be corrected.

When the height h(u, v) of the object such as the ground Q' are given by an information source such as a topographical map or the like, by producing the model P''' having ups and downs as described above and mapping the video data onto the same, the heights of the ground after the position of visual point has been changed can be correctly displayed on the monitor 10.

Below will be described the manner of operation of the image processing apparatus 1 shown in FIG. 2 with reference to FIG. 12.

At step SP1 the image processing apparatus 1 starts to operate.

At step SP2, the image pickup angle measuring means 12 measures the image pickup angle $\theta$ of the television camera 3 with respect to the object such as a golf course 2 or the like. The image pickup angle $\theta$ may be manually meansured by an operator. The image pickup angle $\theta$ measured through the image pickup angle measuring means 12 is supplied to the planar model producing means 13.

At step SP3, the planar model producing means 13 produces a planar model P' in the three-dimensional coordinate system by substituting the image pickup angle $\theta$ and the position (X, Y, SCP) of the picture elements of the object perspectively transformed onto the image pickup elements of the television camera 3 into equations (5), (6) and (7). The data representative of the planar model P' calculated in the planar model producing means 13 is supplied to the height information adding means 15.

At step SP4, it is determined whether or not there is information about the heights (ups and downs) of the golf course 2 or the like. When it is determined that there is the information concerning the heights at step SP4, the data representative of the heights are input through the height information input means 14 to the height information adding means 15 at step SP5. The height information adding means 15 adds the data representing the height to the data representative of the planar model P' calculated in the planar model producing means 13, as indicated in equations (9), (10) and (11). When it is determined that there is no information about the heights at step SP4, the data representative of the planar model P' calculated in the planar model producing means 13 are directly supplied to the memory controlling means 16.

At step SP6, the memory controlling means 16, based on the data supplied from the height information adding means 15 or the planer model producing means 13, produces read addresses for the input image memory 11 and write addresses for the output image memory 18 and supplies these addresses to the input image memory 11 and the output image memory 18, respectively. The video signal supplied from the television camera 3 and stored in the input image memory 11 is read out according to the read addresses supplied from the memory controlling means 16, and written in the output image memory 18 according to the write addresses supplied from the memory controlling means 16. Through this process, video data of respective picture elements of the object perspectively transformed onto the screen 20 can be assigned to the corresponding coordinates of the planar model P' or the model P''' having ups and downs. This operation is the mapping.

At step SP7, the data representing the deformed area VCF, data representing the deformation vector $V_i$, indicating the direction and quantity of the deformation, and data representing the point of action $CP_i$, indicating the position where the deformation is performed, and the data indicating the vector field function $F_i$ are supplied through the input means 5 to the length correction means 30. Also supplied to the length correction means 30 are the data representing the position vector $P_0$ of the planar model P' before the deformation or the data representing the position vector $P_0$ of the model P'''having ups and downs before the deformation from the memory controlling means 16. The length correction means 30, responsive to the respective incoming data, calculates by use of the equation either the position vector $P_N$ of the planer model P' after the deformation or the position vector $P_N$ of the model P''' having ups and downs after the deformation. The data representing the calculated position vector $P_N$ of the planar model P40 after the deformation or position vector $P_N$ of the model P''' having ups and downs after the deformation are supplied to the memory controlling means 16. The memory controlling means 16, based on the data representing the position vector $P_N$ supplied from the length correction means 30, produces the read addresses for the input image memory 11 and the write addresses for the output image memory 18 and supplies these addresses to the input image memory 11 and the output image memory 18, respectively. The video signal stored in the input image memory 11 is read out again according to the read addresses supplied from the memory controlling means 16 and written into the output image memory 18 according to the write addresses supplied from the memory controlling means 16. Through the above-described process, the planar model P' or the model P''' having ups and downs can be amended so that the lengths of the humans T and trees W are corrected.

At step SP8, it is determined whether or not the correction at step SP7 has been completed. The process at this step SP8 is visually performed by the operator determining whether or not the picture image displayed on the monitor 10 has been brought into a desired state.

At step SP9, visual point controlling data for rotating the planar model P' or the model P''' having ups and downs around the x axis, y axis or z axis in the three-dimensional coordinate system shown in FIG. 4 or 10 is supplied through the input means 5 to the visual point setting means 17. The visual point setting means 17 in turn adds the values corresponding to the visual point controlling data to the coordinates of the planar model P' or coordinates of the model P''' having ups and downs supplied from the memory controlling means 16 to thereby produce visual point setting data. The visual point setting data is supplied to the memory controlling means 16. The memory controlling means 16, based on the visual point setting data supplied from the visual point setting means 17, produces the read addresses for the input image memory 11 and the write addresses for the output image memory 18 and supplies these addresses to the input image memory 11 and the output image memory 18, respectively. The video signal stored in the input image memory 11 is read out again according to the read address supplied from the memory controlling means 16 and written into the output image memory 18 according to the write address supplied from the memory controlling means 16. Through the above-described process, the position of visual point with respect to the planar model P' or the model P''' having ups and downs can be changed.

At step SP10, the operator usually determines, from the display on the monitor 10, whether or not a desired state is attained as the result of the setting or change of the position of visual point with respect to the planar model performed at step SP9. When the desired state is attained, the process is ended at the following step SP11. That is, the setting of the position of the visual point and the correction of the picture image are performed between the operator and the image processing apparatus 1 in an interactive manner.

As described above, even of the image pickup angle of the television camera 3 with respect to the golf course 2 and the like is fixed as shown in FIG. 2, the position of the visual point with respect to the golf course 2 displayed on the monitor 10 can be optionally changed. Therefore, it is made easy to change the position of the visual point such that as if the television camera 3 were brought high and left or right to pick up the image. Thus, the sense of distance can be easily acquired.

Further, when the heights h(u, v) of the object such as the golf course and so on are given by such an information source as a topographical map or the like, the model P''' having ups and downs is produced as described above and the video data is mapped thereon, whereby, even if the position of the visual point is changed, the ups and downs of the ground can be correctly reproduced on the monitor 10.

As described above, the position of the visual point of the image picked up by the television camera 3 fixed at the constant position can be changed optionally.

In the first embodiment shown in FIG. 1, the image of object such as the baseball ground 2 is picked up by the two television cameras 3a and 3b whose relative image pickup angles are different by $\alpha$, and the picked up image is processed by the above-mentioned two image processing apparatus 1 such that the visual points of the images output from the image processing apparatus 1a and 1b may become coincident with each other. The thus processed image data are supplied to the circuits of the succeeding stage. In that case, the control means 4, based on the visual point position designating data (angle $\beta$) supplied thereto through the input means 5, supplies the visual point position controlling data to the visual point position setting means 17a and 17b such that the visual points of the images output from the image processing apparatus 1a and 1b become substantially coincident with each other. The visual point position setting means 17a and 17b add values corresponding to the visual point position controlling data to the coordinate values of the model P''' having ups and downs supplied from the memory control means 16a and 16b to thereby produce visual point position setting data. The visual point position setting data are supplied to the memory control means 16a and 16b, respectively. The memory control means 16a and 16b, based on the visual point position setting data supplied from the visual point position setting means 17a and 17b, produces read addresses for the input image memories 11a and 11b and write addresses for the output image memories 18a and 18b, and these addresses are supplied to the input image memories 11a and 11b and the output image memories 18a and 18b, respectively. The video signals stored in the input image memories 11a and 11b are read out in accordance with the read addresses supplied from the memory control means 16a and 16b, and are written in the output image memories 18a and 18b in accordance with the write addresses supplied from the memory control means 16a and 16b.

Picture element data stored in the output image memories 18a and 18b are read out and fed to an image computing apparatus 7 which performs a stereo mapping. More particularly, in this image computing apparatus 7, two video signals supplied thereto are supplied to a corresponding point detecting means 71 and the corresponding point detected and the original video signal are supplied to a distance vector producing means 72 which produces a distance vector corresponding to a difference between the corresponding points of the two video signals. This distance vector is supplied to the control means 4 which produces correction data used to remove the difference of the respective two video signals. Correction data of these video signals are each supplied to correction means 19a and 19b, and these correction data are supplied to the memory control means 16a and 16b therefrom. The memory control means 16a and 16b, based on the correction data supplied from the correction means 19a and 19b, corrects the read addresses for the input image memories 11a and 11b and the write addresses for the output image memories 18a and 18b. Therefore, the visual point positions of the two video signals output from the output image memories 18a and 18b become coincident with each other perfectly.

The assignee of the present application has previously proposed the image processing apparatus 7 for performing the stereo mapping (see Japanese Patent Laid-Open Gazette No. 2-25989).

The corrected video signals are supplied to a switcher 8 having a fader, in which they are multiplied with coefficients (1-W) and W by coefficient multiplying means 81a and 81b and then added by an adder 82. In this way, the added video signal is fed to an output terminal 9 and displayed on the monitor 10.

Examples of image of the object 2 picked up by the television cameras 3a and 3b will be described with reference to FIG. 13 and FIGS. 14A-14E.

Figure 13:
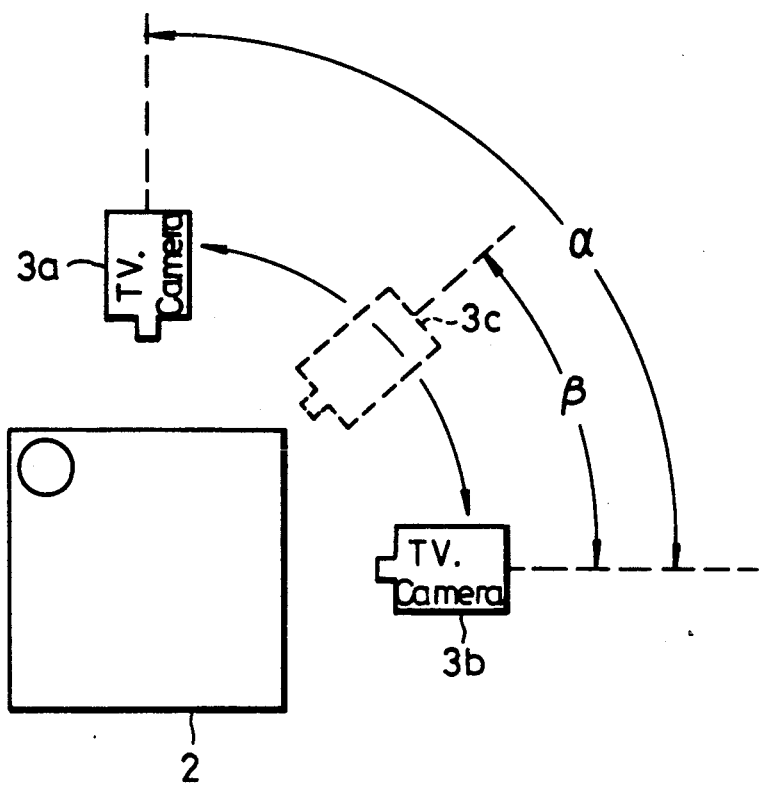
FIG. 13 is a schematic diagram showing the positions of video cameras in the image signal processing apparatus of FIG. 1.
Figure 14A:
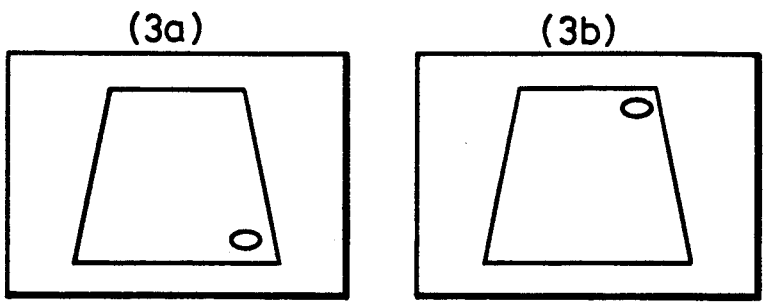
FIGS. 14A-14E are schematic diagrams showing the positions of visual points of respective portions of the image signal processing apparatus of FIG. 1 relative to the images, respectively.
Figure 14B:
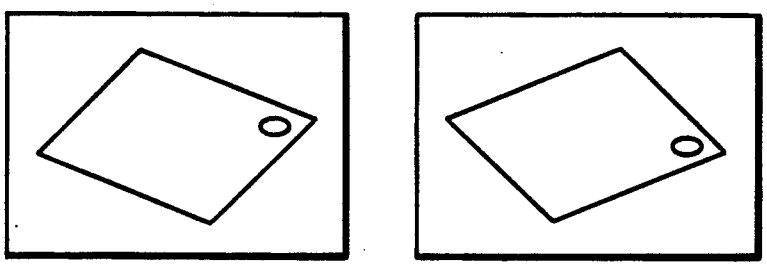
Figure 14C:
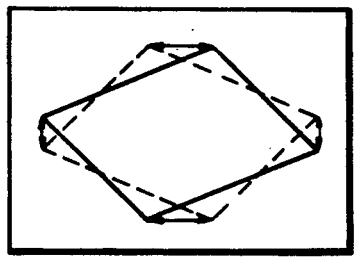

When the television cameras 3a and 3b are located at the positions different by the angle $\alpha$ for picking up the image of the object 2 as shown in FIG. 13, the video signals from the television camera 3a and 3b are presented as shown in FIG. 14A. These video signals are stored in the input image memories 11a and 11b. If these video signals are processed under the condition such that the visual point position is changed to the position different from the television camera 3b by the image pickup angle $\beta$ as represented by reference numeral 3c in FIG. 13C, video signals shown in FIG. 14B are read out from the output image memories 18a and 18b.

Figure 14D:
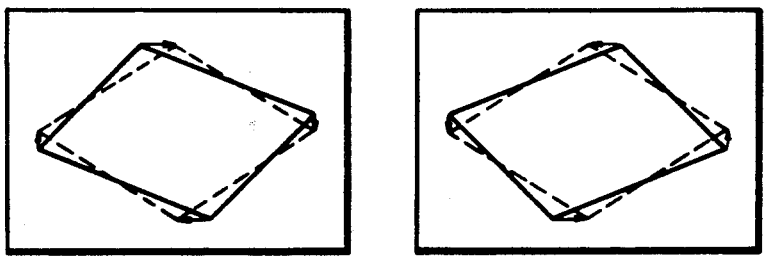
Figure 14E:
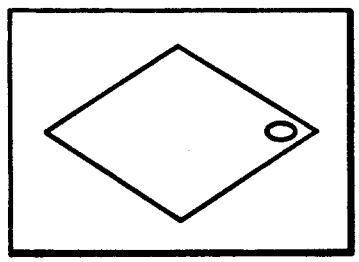

Ideally speaking, the video signals thus read out would coincide with each other but the two video signals are different by a very small amount due to a problem in accuracy in practice. Therefore, these video signals are supplied to the image computing apparatus 7, whereby a corresponding point is detected to produce a displacement distance vector shown in FIG. 14C. Then, such distance vector is supplied to the control means 4, whereby the respective video signals are corrected by ½ of the distance vector each as shown in FIG. 14D. These corrected video signals are added by the switcher 8 with a fader, thereby as shown in FIG. 14E a video signal from a visual point position 3c being formed.

Therefore, by sequentially moving the visual point position 3c from the position of the camera 3a to the position of the camera 3b, it is possible to obtain a video signal which successively moves between the two cameras 3a and 3b.

Figure 15:
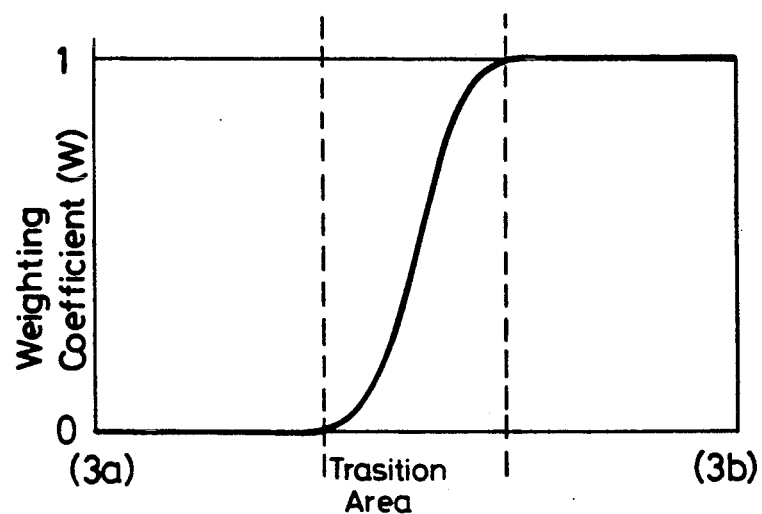
FIG. 15 is a graph of characteristics of a switcher having a fader used in the image signal processing apparatus of FIG. 1.

In actual practice, the switching operation in the switcher 8 with a fader is performed as, for example, shown in FIG. 15, wherein signals Ca and Cb, which results from processing these video signals are produced from the cameras 3a, 3b and a predetermined position. Also, during the transition period, as illustrated, the weighting coefficient w is changed and weighted video signals are added to produce a signal C which is expressed as:

$$C = (1-w) \times Ca + w \times Cb$$

Here, the transition period is not limited to the center position between the cameras 3a and 3b and may be provided at a portion in which the visual point position is moved at high speed and at a portion in which a correlation of the thus processed video signals is high.

As described above, according to the apparatus of the present invention, when the image of one camera is switched to the image of the other camera, by successively moving the third visual point position from one camera to the other camera, it is possible for the viewer to clearly grasp the visual point position of the other camera. Therefore, no limitation need not be provided on the switching operation of the images, thus making it possible to switch the images more freely.

In the aforenoted apparatus, it is frequently observed that a distortion occurs in a portion which is not involved in the model where baseball players are produced. In that case, the operator watches the monitor 10 and the portion in which the distortion occurs can be corrected by using the input means 5. This correction is performed by utilizing the technique described in U.S. Pat. No. 4,956,706.

Further, in the above-mentioned apparatus, when a visual field is changed due to difference of lenses of the cameras 3a and 3b or the like, the above processing can be performed by using a proper technique for enlarging or reducing an image together.

Furthermore, in the above-mentioned apparatus, when the angle $\alpha$ between the cameras 3a and 3b is small, the aforenoted processing can be carried out only by the stereo-matching processing within the above-mentioned processings.

Figure 16:
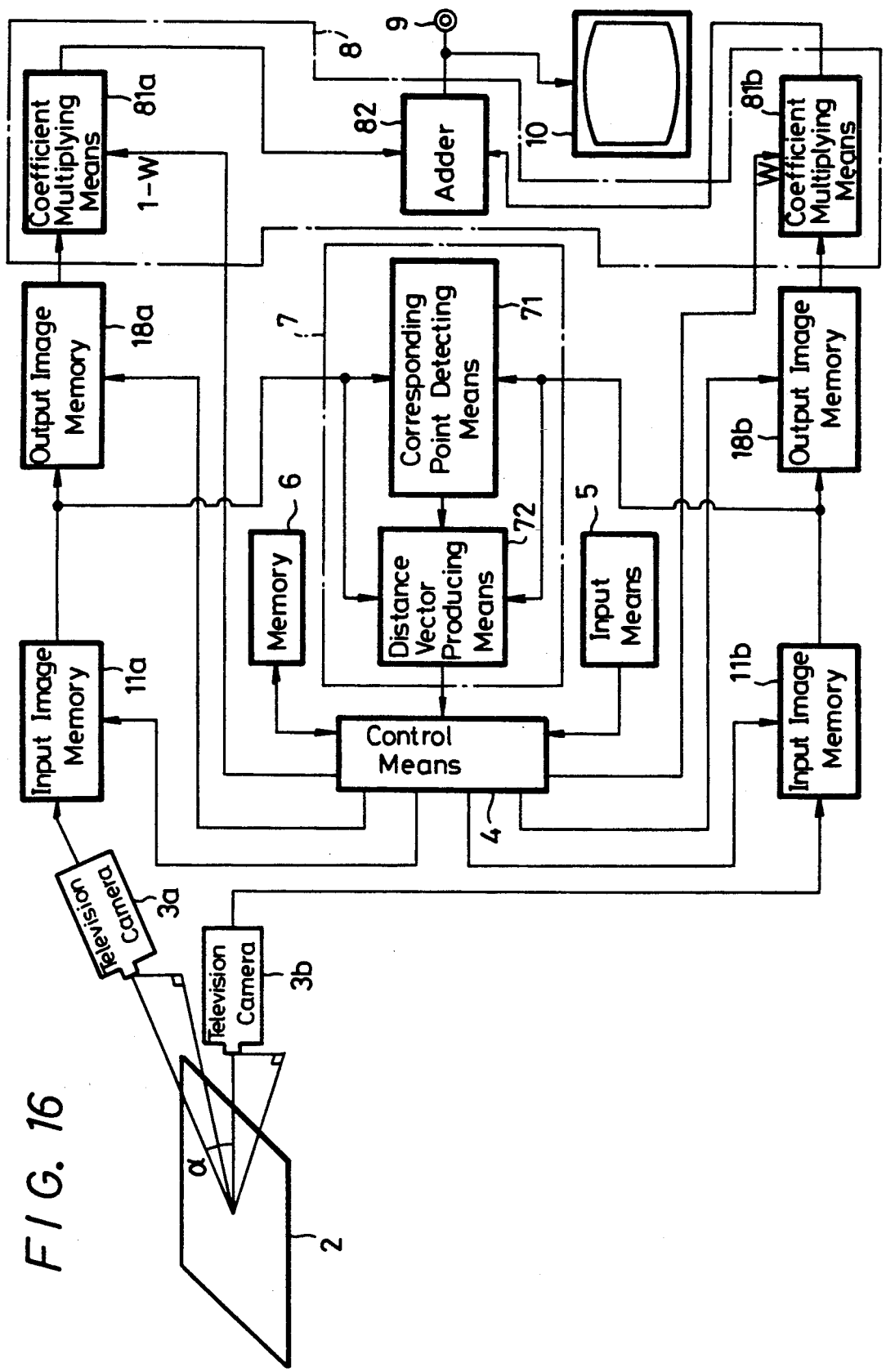
FIG. 16 is a block diagram showing a second embodiment of the image signal processing apparatus according to the present invention.

More specifically, FIG. 16 shows an arrangement of the apparatus used in the stereo-matching process.

Referring to FIG. 16, the cameras 3a and 3b are located with a small angle $\alpha$ relative to the image of the object 2. Then, video signals of the object image 2 picked up by the cameras 3a and 3b are respectively supplied to input image memories 11a and 11b so that they are stored therein at predetermined addresses at every picture element.

These video signals are supplied to the image computing apparatus 7 which performs the stereo-matching processing. That is, in this image computing apparatus 7, two incoming video signals are supplied to a corresponding point detecting means 71, and a detected corresponding point and the original video signals are supplied to a distance vector producing means 72 which produces a distance vector corresponding to the change of the corresponding point of the two video signals. This distance vector is supplied to the control means 4, and command data from the input means 5 is supplied to the control means 4, thereby producing correction data which is used to change the visual point position of each video signal. On the basis of this correction data, the control means 4 produces read addresses for the input image memories 11a, 11b and write addresses for the output image memories 18a, 18b, and supplies these read and write addresses to the input image memories 11a, 11b and the output image memories 18a, 18b. Accordingly, the visual point positions of the respective video signals stored in the output image memories 18a and 18b become visual point positions instructed via the input means 5 and the visual point positions are accurately coincident with each other. As the image computing apparatus 7 which performs the stereo-matching processing, it is possible to utilize such apparatus that is previously proposed by the assignee of the present application in Japanese Patent Laid-Open Gazette No. 2-25989.

Then, video signals read out from the output image memories 18a and 18b are supplied to the switcher 8 having the fader, wherein these video signals are multiplied with coefficients $(1-w)$ and $w$ by coefficient multiplying means 81a and 81b and added by the adder 82. The thus added video signal is fed to the output terminal 9 and also displayed on the monitor 10.

Figure 17A:
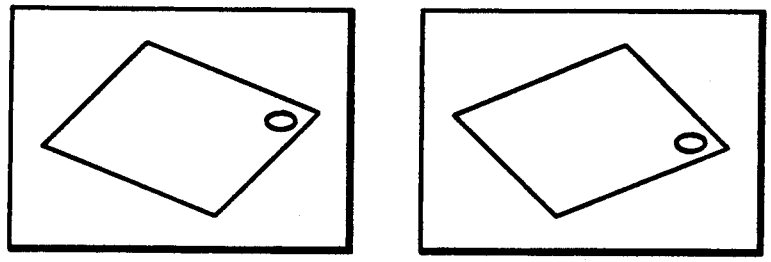
FIGS. 17A-17D are schematic diagrams showing the positions of visual points of respective portions of the image signal processing apparatus of FIG. 16 relative to the images, respectively.
Figure 17B:
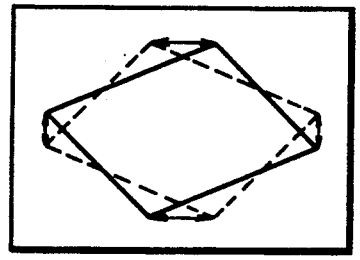
Figure 17C:
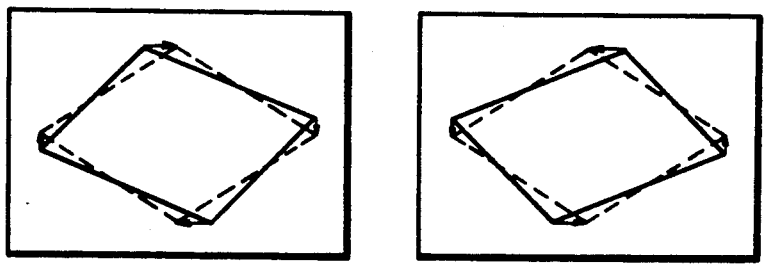
Figure 17D:
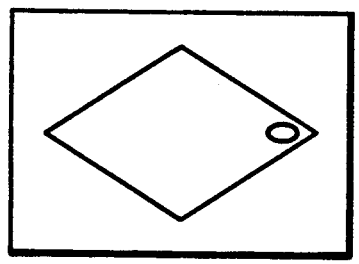

Accordingly, in this apparatus, video signals shown in FIG. 17A are read out from the input image memories 11a and 11b. These video signals are supplied to the image computing apparatus 7, in which a corresponding point therebetween is detected to produce a distance vector which is changed as shown in FIG. 17B. When such distance vector is supplied to the control means 4, as shown in FIG. 17C, the respective video signals are complementarily corrected in response to the distance vector and the command from the input means 5. These corrected video signals are added by the switcher 8 with the fader which is constructed the same arrangement mentioned above, thereby producing a video signal from a desired visual point position between the cameras 3a and 3b as shown in FIG. 17D.

As described above, according to this apparatus, by sequentially moving the visual point position from the position of the camera 3a to the position of the camera 3b, it is possible to obtain a video signal which successively moves between the two cameras 3a and 3b.

As set forth above, according to the present invention, when the image of one camera is switched to the image of the other camera, by successively moving the third visual point position from one camera to the other camera, it is possible for the viewer to clearly grasp the visual point position of the other camera. Therefore, the switching operation of the image need not be limited and the images can be switched more freely.

Having described preferred embodiments of the invention with reference to the accompanying drawings, it is to be understood that the invention is not limited to those precise embodiments and that various changes and modifications thereof could be effected by one skilled in the art without departing from the spirit or scope of the novel concepts of the invention as defined in the appended claims.

I claim as my invention:

1. A visual point position control apparatus for controlling positions of the visual points of images picked up by first and second cameras, comprising:
    a) first producing means, based on coordinates of picture elements of image pickup elements of the first camera and an image pickup angle of the first camera relative to an image of an object picked up, for producing a first model of a picked up plane of the image of the object in a three-dimensional coordinate system;
    b) second producing means, based on coordinates of picture elements of image pickup elements of the second camera and an image pickup angle of the second camera relative to an image of the object picked up, for producing a second model of a picked up plane of the image of the object in a three-dimensional coordinate system;
    c) first mapping means for mapping image data output from the first camera onto the first model produced by the first producing means;
    d) second mapping means for mapping image data output from the second camera onto the second model produced by the second producing means;
    e) moving means for computationally rotating and moving the first and second models onto which image data are mapped within an angle $\alpha$, formed by the visual point positions of the first and second cameras in the three-dimensional coordinate system, by angles $\beta$ and $(\alpha - \beta)$, respectively; and
    f) mixing means for mixing the image data mapped onto the first model and the image data mapped onto the second model by a mixing ratio corresponding to the rotation angles $\beta$ and $(\alpha - \beta)$ of the first and second models.

2. A visual point position control apparatus according to claim 1, further comprising display means for displaying an image on the basis of image data output from the mixing means.

3. A visual point position control apparatus as claimed in claim 1, wherein the moving means includes input means for inputting the angle $\beta$.

4. A visual pint position control apparatus as claimed in claim 1, wherein the moving means includes displacement detecting means supplied with the image data output from the first mapping means and the image data output from the second mapping means to thereby detect a displacement between these images and the moving means rotates the first and second models such that the displacement becomes zero.

5. A visual point position control apparatus as claimed in claim 4, wherein the displacement detecting means comprises:
  a) corresponding point detecting means for detecting a corresponding point of the image output from the first mapping means and the image output from the second mapping means; and
  b) distance vector producing means, based on an output signal of the corresponding point detecting means, for producing a distance vector between the image output from the first mapping means and the image output from the second mapping means.

6. A visual point position control apparatus as claimed in claim 1, wherein the mixing means comprises:
  a) first multiplying means for multiplying the image data mapped onto the first model with a weighting coefficient w;
  b) second multiplying means for multiplying the image data mapped onto the second model with a weighting coefficient $(1-w)$; and
  c) adding means for adding together an output signal of the first multiplying means and an output signal of the second multiplying means.

7. A visual point position control means as claimed in claim 6, wherein the mixing means changes the coefficient w with the changes of the angles $\beta$ and $(\alpha - \beta)$ and increases the ratio in which the coefficient is changed with a decrease of the difference between the angles $\beta$ and $(\alpha - \beta)$.

8. A visual point position control apparatus for controlling positions of the visual points of images picked up by first and second cameras, comprising:
  a) first memory means for storing image data output from the first camera;
  b) second memory means for storing an output signal of the first memory means;
  c) third memory means for storing image data output from the second camera;
  d) fourth memory means for storing an output signal of the third memory means;
  e) corresponding point detecting means for detecting a corresponding point of a first image picked up by the first camera and a second image picked up by the second camera;
  f) distance vector producing means for producing a distance vector connecting corresponding points of the first and second images on the basis of an output signal from the corresponding point detecting means;
  g) input means for inputting a desired image pickup angle $\beta$;
  h) moving means, based on an output signal of the distance vector producing means and an output signal of the input means, produces read addresses of the first and third memory means and write addresses of the second and fourth memory means and rotating an image output from the first camera by the angle $\beta$ within an angle $\alpha$ formed by the visual point positions of the first and second cameras and rotating an image output from the second camera by the angle $(\alpha - \beta)$; and
  i) synthesizing means for synthesizing image data output from the second memory means and image data output from the fourth memory means by a ratio corresponding to the angle $\beta$.

9. A visual point position control apparatus according to claim 8, further comprising display means for displaying an image on the basis of image data output from the synthesizing means.

10. A visual point position control apparatus as claimed in claim 8, wherein the synthesizing means comprising:
  a) first multiplying means for multiplying output data of the second memory means with a weighting coefficient w;
  b) second multiplying means for multiplying output data of the fourth memory means with a weighting coefficient $(1-w)$; and
  c) adding means for adding an output signal of the first multiplying means and an output signal of the second multiplying means.

11. A visual point position control apparatus as claimed in claim 10, wherein in the first multiplying means and the second multiplying means the coefficient w is changed with changes of the angle $\beta$ and the angle $(\alpha - \beta)$, respectively, and the ratio in which the coefficient w is changed is increased with a decrease of the difference between the angles $\beta$ and $(\alpha - \beta)$.

* * * * *